United States Patent
Jabra

(10) Patent No.: US 8,979,164 B2
(45) Date of Patent: Mar. 17, 2015

(54) MECHANICAL SNAP RETAINER ASSEMBLY FOR WEATHERSEAL

(75) Inventor: Paul G. Jabra, Troy, MI (US)

(73) Assignee: Cooper-Standard Automotive Inc., Novi, MI (US)

( * ) Notice: Subject to any disclaimer, the term of this patent is extended or adjusted under 35 U.S.C. 154(b) by 253 days.

(21) Appl. No.: 13/511,265

(22) PCT Filed: Nov. 23, 2010

(86) PCT No.: PCT/US2010/057853
§ 371 (c)(1),
(2), (4) Date: May 22, 2012

(87) PCT Pub. No.: WO2011/063405
PCT Pub. Date: May 26, 2011

(65) Prior Publication Data
US 2012/0228448 A1    Sep. 13, 2012

Related U.S. Application Data

(60) Provisional application No. 61/263,722, filed on Nov. 23, 2009.

(51) Int. Cl.
*B60J 10/04* (2006.01)
*B60J 10/00* (2006.01)
*B60J 10/08* (2006.01)

(52) U.S. Cl.
CPC .......... *B60J 10/0022* (2013.01); *B60J 10/0062* (2013.01); *B60J 10/04* (2013.01); *B60J 10/08* (2013.01)
USPC ......... 296/93; 296/1.08; 296/146.2; 49/490.1

(58) Field of Classification Search
USPC ............ 296/146.2, 93, 1.08; 49/490.1, 493.1, 49/502
See application file for complete search history.

(56) References Cited

U.S. PATENT DOCUMENTS

| | | | |
|---|---|---|---|
| 2,464,406 | A | 3/1949 | Kramer |
| 5,042,873 | A | 8/1991 | Yagami |
| 5,050,349 | A | 9/1991 | Goto et al. |
| 5,261,188 | A | 11/1993 | Vaughan |
| 5,331,768 | A | 7/1994 | Takeuchi |
| 5,347,758 | A | 9/1994 | Yamane |
| 5,356,194 | A | 10/1994 | Takeuchi |

(Continued)

OTHER PUBLICATIONS

PCT/US2010/0557853 International Search Report and Written Opinion, Feb. 7, 2011.

*Primary Examiner* — Jason S Morow
(74) *Attorney, Agent, or Firm* — Fay Sharpe LLP

(57) ABSTRACT

A one-piece retainer assembly comprises a first retainer portion that operatively couples to a second retainer portion. The first retainer portion includes an outer show portion that extends from a first base portion, a retaining flange that protrudes from an inner surface of the show portion, and a first mechanical securing member provided in the first base portion. The second retainer portion includes a leg portion that extends from a second base portion, a retaining flange that protrudes form an inner surface of the leg portion, and a second mechanical securing member provided in the second base portion. An interior weatherstrip-receiving cavity is formed when the first retainer portion mechanically engages the second retainer portion. In the preferred embodiments, the male mechanical securing member includes a locking tab and the female mechanical securing member includes a locking recess.

21 Claims, 10 Drawing Sheets

(56) References Cited

U.S. PATENT DOCUMENTS

| | | | |
|---|---|---|---|
| 5,367,830 A | 11/1994 | Omura et al. | |
| 5,369,914 A | 12/1994 | Takeuchi | |
| 5,462,292 A | 10/1995 | Yamane | |
| 5,527,583 A | 6/1996 | Nozaki et al. | |
| 5,649,405 A | 7/1997 | Morihara et al. | |
| 5,775,768 A | 7/1998 | Yamane | |
| 5,791,722 A | 8/1998 | Nozaki et al. | |
| 5,806,914 A | 9/1998 | Okada | |
| 5,992,021 A | 11/1999 | Takeda et al. | |
| 6,115,967 A | 9/2000 | Warnecke | |
| 6,205,712 B1 | 3/2001 | Ellis | |
| 6,226,953 B1 | 5/2001 | Uno et al. | |
| 6,412,226 B1 | 7/2002 | Nozaki et al. | |
| 6,420,693 B1 | 7/2002 | Nakatsuji et al. | |
| 6,536,833 B2 | 3/2003 | Nozaki | |
| 6,536,834 B2 | 3/2003 | Yamashita et al. | |
| 6,598,348 B2 | 7/2003 | Palicki | |
| 6,625,931 B2 | 9/2003 | Omori et al. | |
| 6,640,499 B2 | 11/2003 | Yamashita et al. | |
| 6,668,488 B2 | 12/2003 | Nozaki et al. | |
| 6,723,414 B2 | 4/2004 | Aritake et al. | |
| 6,777,068 B2 | 8/2004 | Teramoto et al. | |
| 6,824,279 B2 | 11/2004 | Shigesada et al. | |
| 6,832,451 B2 | 12/2004 | Yamashita et al. | |
| 6,938,378 B2 | 9/2005 | Nozaki et al. | |
| 6,944,917 B2 | 9/2005 | Yanagita et al. | |
| 6,964,133 B2 | 11/2005 | Aritake et al. | |
| 7,055,285 B2 | 6/2006 | Nozaki | |
| 7,070,224 B2 | 7/2006 | Tsuchida | |
| 7,082,721 B2 * | 8/2006 | Whitehead | 49/490.1 |
| 7,350,849 B2 | 4/2008 | Roush et al. | |
| 2002/0126498 A1 | 9/2002 | Atkinson et al. | |
| 2005/0235573 A1 | 10/2005 | Roush et al. | |
| 2008/0000166 A1 * | 1/2008 | Whitehead | 49/490.1 |
| 2011/0204671 A1 * | 8/2011 | Baratin | 296/93 |

* cited by examiner

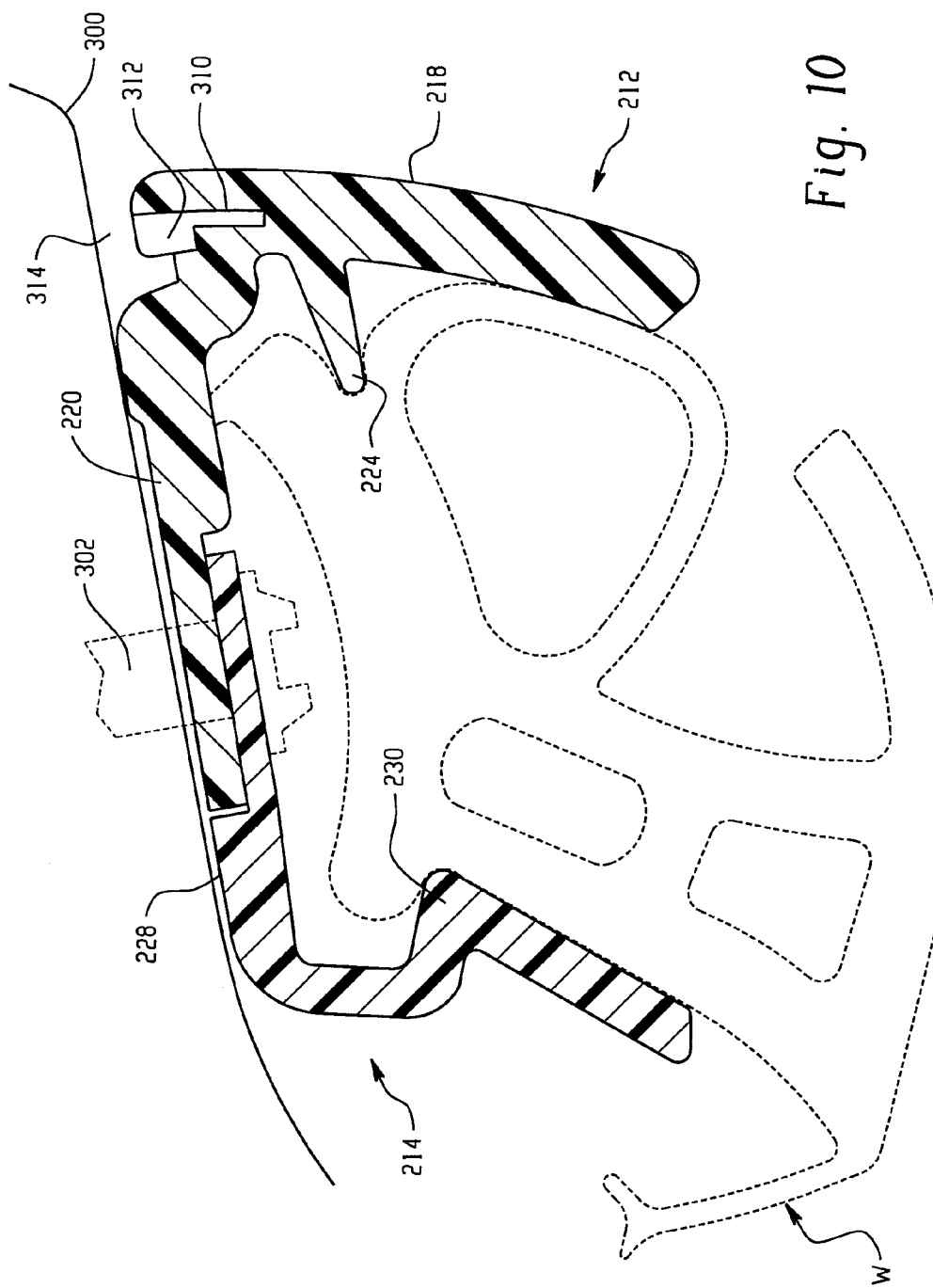

MECHANICAL SNAP RETAINER ASSEMBLY FOR WEATHERSEAL

CROSS-REFERENCE TO RELATED APPLICATIONS

This application is a 35 USC 371 national stage entry of international PCT/US2010/057853, filed 23 Nov. 2010, which claims the priority benefit of U.S. provisional application Ser. No. 61/263,722, filed 23 Nov. 2009.

This application is related to commonly owned U.S. Pat. No. 7,350,849, issued Apr. 1, 2008, and expressly incorporates the subject matter of the '849 patent as if fully rewritten herein.

BACKGROUND OF THE DISCLOSURE

This disclosure relates to a weatherstrip or weatherseal mounting or retaining structure and, more particularly, to a retainer assembly for securing weatherseals to an associated vehicle body.

Existing retainers mount glass edge seals along peripheral portions of an opening in a vehicle body, for example, about the periphery of a door window opening. These retainers are preferably one-piece and eliminate distinctive joint lines where separate components of the retainer meet. U.S. Pat. No. 7,350,849 discloses, for example, a retainer which comprises (i) a show portion that extends from a generally planar first base portion, and (ii) a leg portion that extends from a generally planar second base portion which are fused together along the base portions into a one-piece retainer that forms a cavity dimensioned to receive and retain a weatherseal in the cavity. The generally planar base portions overlap and receive fasteners that extend through spatially aligned openings. The fasteners pass through the aligned openings in the retainer and into corresponding openings formed in the vehicle body to secure the retainer thereto.

While an improvement over earlier retainer assemblies, these existing one-piece retainers have undesired restrictions and limitations. For example, specialized tooling is required to fusion bond or ultrasonically weld together regions on the overlapping surfaces of the first and second base portions. This adds cost associated with the inclusion of heat staking equipment in the manufacturing line. Moreover, the fusion bond process necessarily requires the first and second base portions to be formed of similar materials. This limits the variability and potential end uses of the retainer.

Thus, although this one-piece retainer has been commercially successful and provides certain advantages over prior arrangements, there is still a need to reduce cost of manufacture, reduce cost of assembly, ease installation, and expand use of dissimilar materials in forming the retainer.

SUMMARY OF THE DISCLOSURE

The present disclosure is directed towards a retainer assembly that secures a weatherseal to an opening in an associated vehicle body.

A first exemplary embodiment of a retainer assembly includes a first retainer portion that is operatively coupled to a second retainer portion. The first retainer portion includes an outer show portion that extends from a first base portion, a retaining flange that protrudes from the outer show portion, and a first securing member and a second securing member provided in the first base portion. The second retainer portion includes a leg that extends from a second base portion, a retaining flange that protrudes from the leg, and a second securing member provided in the second base portion that mechanically engages the securing member of the first base portion. Securing the first and second retainer portions together forms a cavity that is adapted to receive an associated weatherstrip.

In another embodiment, a cavity is provided in the retainer assembly to advantageously position a lighting device preferably along an edge of the retainer assembly.

A primary benefit provided by this disclosure relates to the elimination of additional steps and equipment for joining first and second portions of a retainer assembly.

Another feature resides in the ease of installation of the two-piece retainer assembly.

Yet another advantage is associated with the ability to join dissimilar first and second materials in an inexpensive, reliable manner.

Still, other features and benefits will be found in the following, detailed description.

BRIEF DESCRIPTION OF THE DRAWINGS

FIG. 10 is a view similar to FIG. 9 with the weatherseal shown in dotted line and the addition of a light member.

DETAILED DESCRIPTION OF THE PREFERRED EMBODIMENTS

Figure 7:
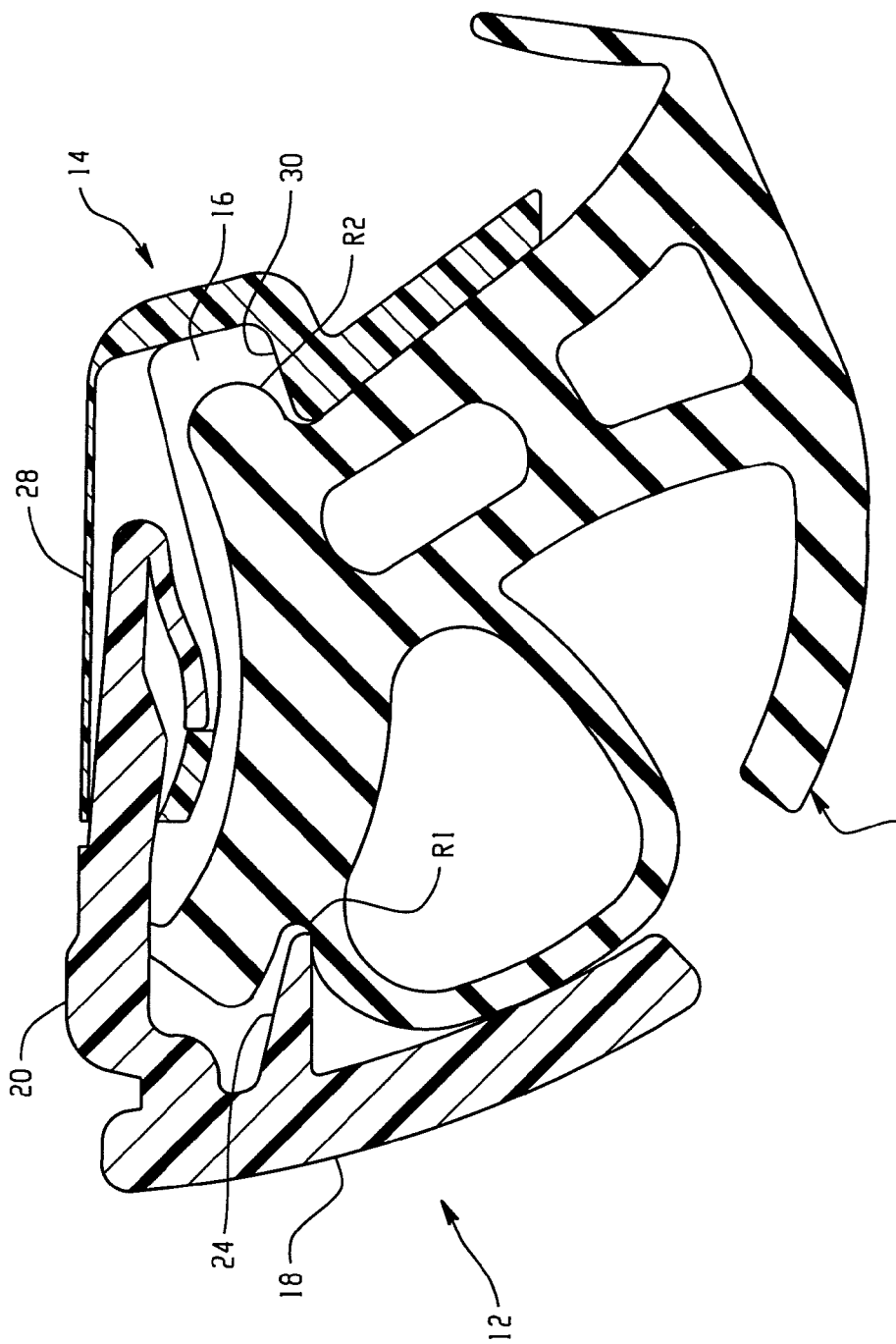
FIG. 7 is a side perspective view of a retainer-and-weatherstrip assembly according to a third embodiment of the disclosure.

The present disclosure is directed to a retainer assembly 10 for securing a weatherstrip or weatherseal W to glass-opening edges on an associated vehicle body. FIGS. 1-4 illustrate a first embodiment of this retainer assembly disclosure. More particularly, the retainer assembly includes a first retainer portion 12 in mechanical engagement with a second retainer portion 14 which together form an interior cavity 16 for receiving an associated weatherseal W (FIG. 7). Although only a segment or partial longitudinal portion of the retainer assembly is shown, one skilled in the art will recognize that the retainer assembly has an elongated length that proceeds along an inner peripheral region of an opening in the vehicle body, for example, about the window opening in a vehicle door where peripheral edge portions of the associated window or glass are received in the weatherseal mounted or secured in the retainer assembly. Thus, the retainer assembly and components thereof have an extended length that typically coincides with the inner periphery of the vehicle body opening or external peripheral portions of the window.

The first retainer portion 12 includes an outer show surface or show portion 18 that extends from a continuous first base portion 20. In the particular embodiment, the show portion and the first base portion are disposed in a generally L-shape, i.e., the outer show portion is disposed approximately perpendicular or at an included angle slightly less than perpendicular relative to the first base portion. The outer show portion 18 typically has a slight, inward curvature (for example, a distal edge of the show portion is bent inwardly toward the first base portion as the show portion proceeds outwardly from the junction with the first base portion) and is dimensioned to overlie a glass-edge perimeter (not shown) on the outer body side of the vehicle. The surface of the outer show portion 18 transitions smoothly along, contours, and blends into a surface of the vehicle surface surrounding the window.

The outer show portion 18 is joined along a recessed corner edge 22 (FIG. 2) formed where an inner length of the outer show portion meets an inner length of the first base portion 20. Further, a first retaining flange 24 protrudes inwardly from an inner surface of the outer show portion 18, preferably at a location adjacent the corner edge to engage a corresponding recess R1 in the weatherseal W (FIG. 7). Typically, the weatherseal W is formed from a material that is more flexible than the retainer so that the weatherseal is inserted into the retainer and an undercut region or recess R1 is mechanically engaged by the retaining flange to hold the weatherseal in place in the retainer assembly and prevent inadvertent removal therefrom. The retaining flange 24 is in generally perpendicular relationship to the inner surface of the outer show portion which provides a secure retaining feature.

The second retainer portion 14 operatively cooperates with the first retainer portion 12, specifically the second retainer portion is mechanically joined to the first retainer portion. A leg portion 26 extends outwardly from a generally planar, second base portion 28. The leg portion 26 preferably extends from the second base portion 28 at a generally obtuse angle, with a recess 30 disposed intermediate the leg portion and the second base portion. The recess forms a generally squared shoulder or retaining flange 30 that engages an undercut region R2 of the weatherseal in a manner similar to the first retaining flange 24 received in the recess R1 so that the weatherseal is mechanically engaged by the retainer assembly and cannot be inadvertently removed from the retainer assembly.

The first retainer portion 12 cooperates with the second retainer portion 14 along their respective base portions 20, 28 to achieve the mechanical engagement between these components. Specifically, the first retainer portion 12 has at least one of a male and female securing member provided in the first base portion, and the second retainer portion 14 comprises at least one of the other of the male and female mechanical securing member provided in the second base portion. Typically, plural male and female securing members cooperatively engage one another at longitudinally spaced locations along the lengths of the first and second base portions of the retaining portions.

The male and the female mechanical securing members of the first and second base portions 20, 28 couple in a manner that maintains a generally planar relation or surface to the retainer assembly 10. The planar surface conformation of the base region of the retainer assembly permits flush engagement with the associated vehicle body about the perimeter of the opening.

Figure 1:
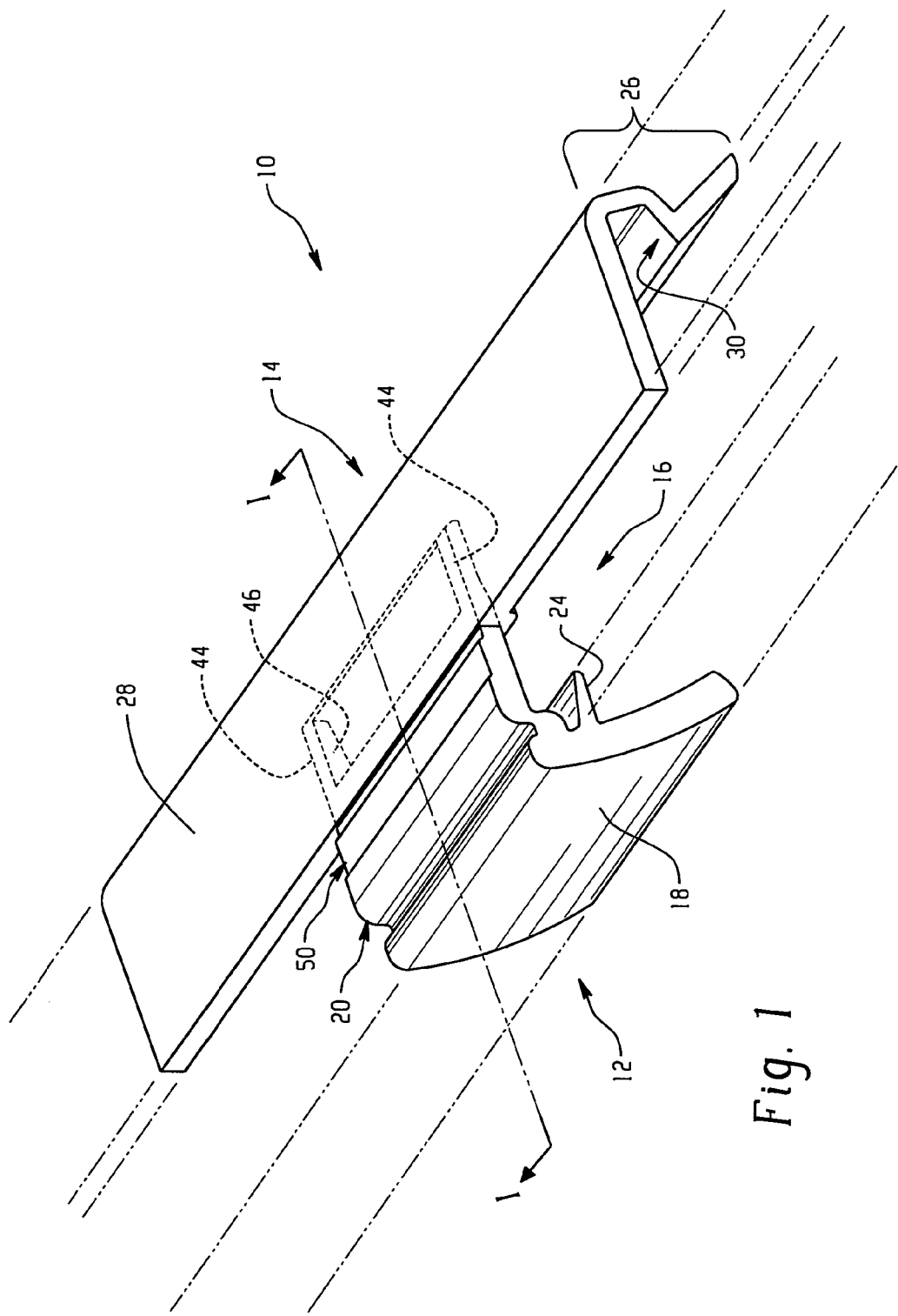
FIG. 1 is a perspective view of a partial portion of an elongated retainer assembly according to a first embodiment of the disclosure.
Figure 2:
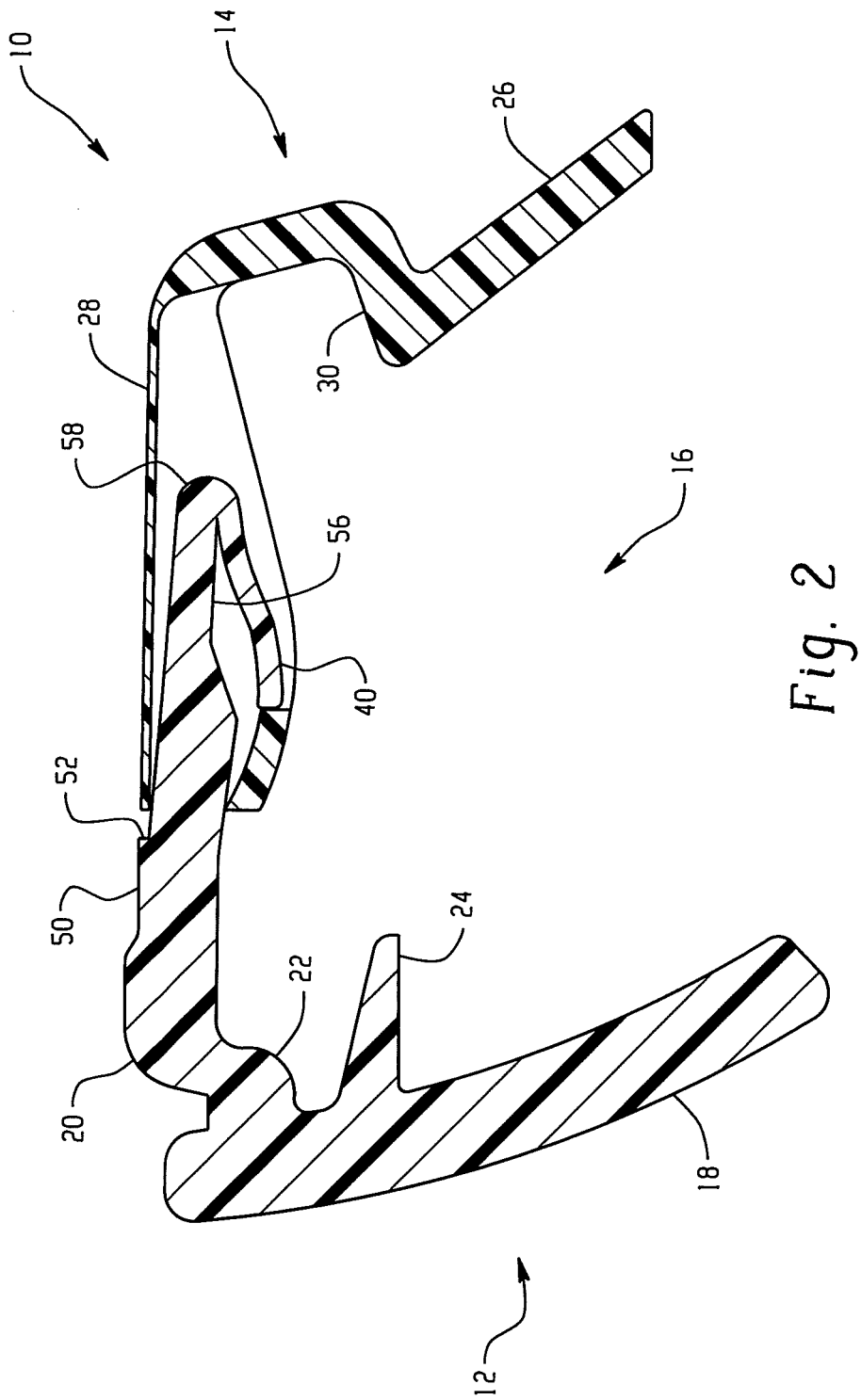
FIG. 2 is a cross-sectional view taken generally along lines I-I of the retainer assembly shown in FIG. 1.
Figure 3:
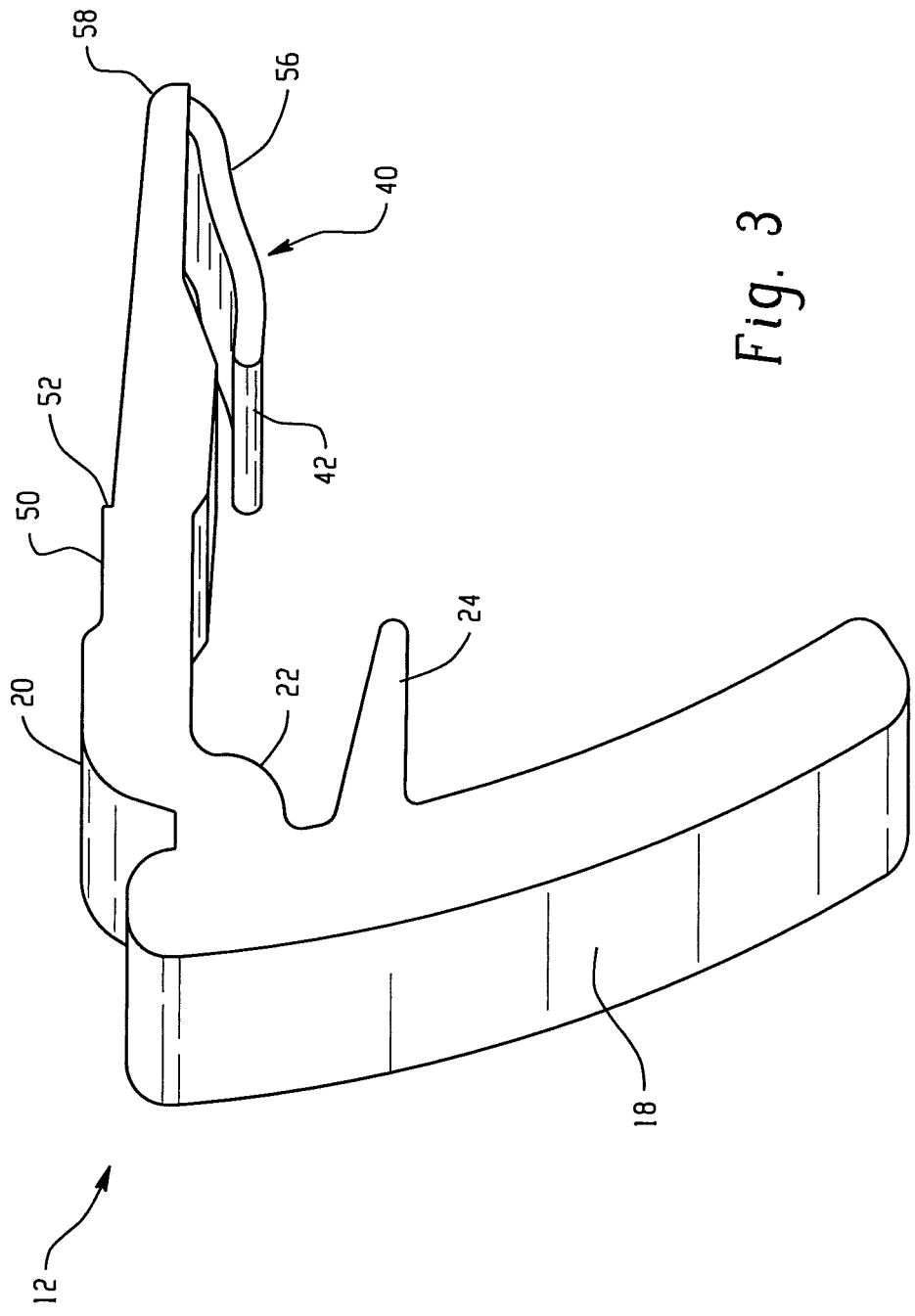
FIG. 3 is a perspective view of a partial first portion of the retainer assembly shown in FIG. 2.
Figure 4:
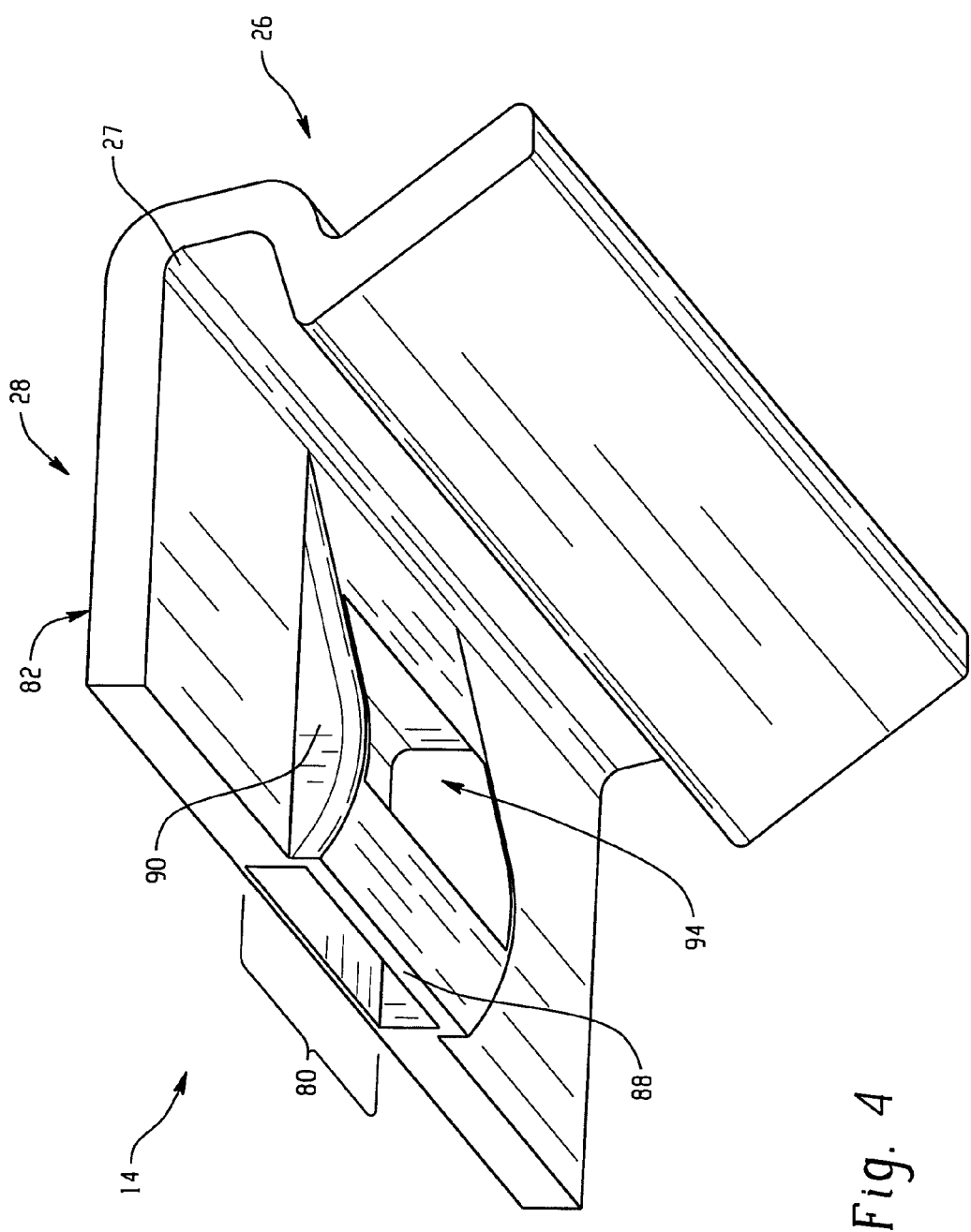
FIG. 4 is a perspective view from an underside of a partial second portion of the retainer assembly shown in FIG. 1.

A preferred form of the corresponding male and female mechanical securing members is shown in the retainer assembly 10 of FIGS. 1-4. The first retainer portion 12 includes a locking tab portion 40 (FIG. 3) which is cantilever-mounted at a distal or terminal end or leading edge 58 of the first planar base portion 20. The locking tab portion is hinged at the leading edge and a free end 42 of the locking tab can pivot upwardly toward the first base portion in response to insertion of the tab portion into a corresponding opening or locking recess 80 formed in the second retainer portion 14 (FIG. 4). That is, the height of the opening/recess 80 is less than the normal unbiased position of the free end 42 of the locking tab so that the locking tab deflects or pivots as the first and second retainer portions 12, 14 are advanced toward one another.

The locking tab portion 40 is supported on opposite edges by a pair of parallel legs 44 that extend from the first base portion 20. The locking tab portion 40 includes an inward-turned finger (hereinafter referred to as the "locking tab 40") situated between terminal ends of each of the legs 44 and is preferably shaped to follow a generally arcuate curve, although the locking tab will deform or pivot as the tab portion is advanced into the recess of the second base portion. The locking tab 40 is normally spaced from the plane of the base portion and extends downwardly by a gap or dimension 46 (FIG. 1) from the pair of legs 44 until the tab encounters a force that urges the locking tab in plane with the remainder of the first base portion, i.e., upon insertion in to the reduced height of the recess 80.

The first base portion 12 further includes a planar surface 50 (FIG. 2) that has a shoulder 52 that is advanced into mechanical engagement with the second base portion 14, particularly with the recess 80. Upon complete receipt in the recess, the locking tab 40 deflects downwardly and engages shoulder 88 in the recess of the second base portion to preclude inadvertent removal and maintain the mechanically locked relationship.

An opening 94 (FIG. 4) is provided along an inner surface of the second retainer portion. This opening 94 provides access to the locking tab 40 when the latter is engaged within the locking recess 80; namely, the opening 94 can provide a release capability so that the first retainer portion 12 can mechanically disengage the second retainer portion 14. Specifically, to mechanically disengage the retainer assembly 10, a user depresses the locking tab 40 through the opening 94.

Figure 5:
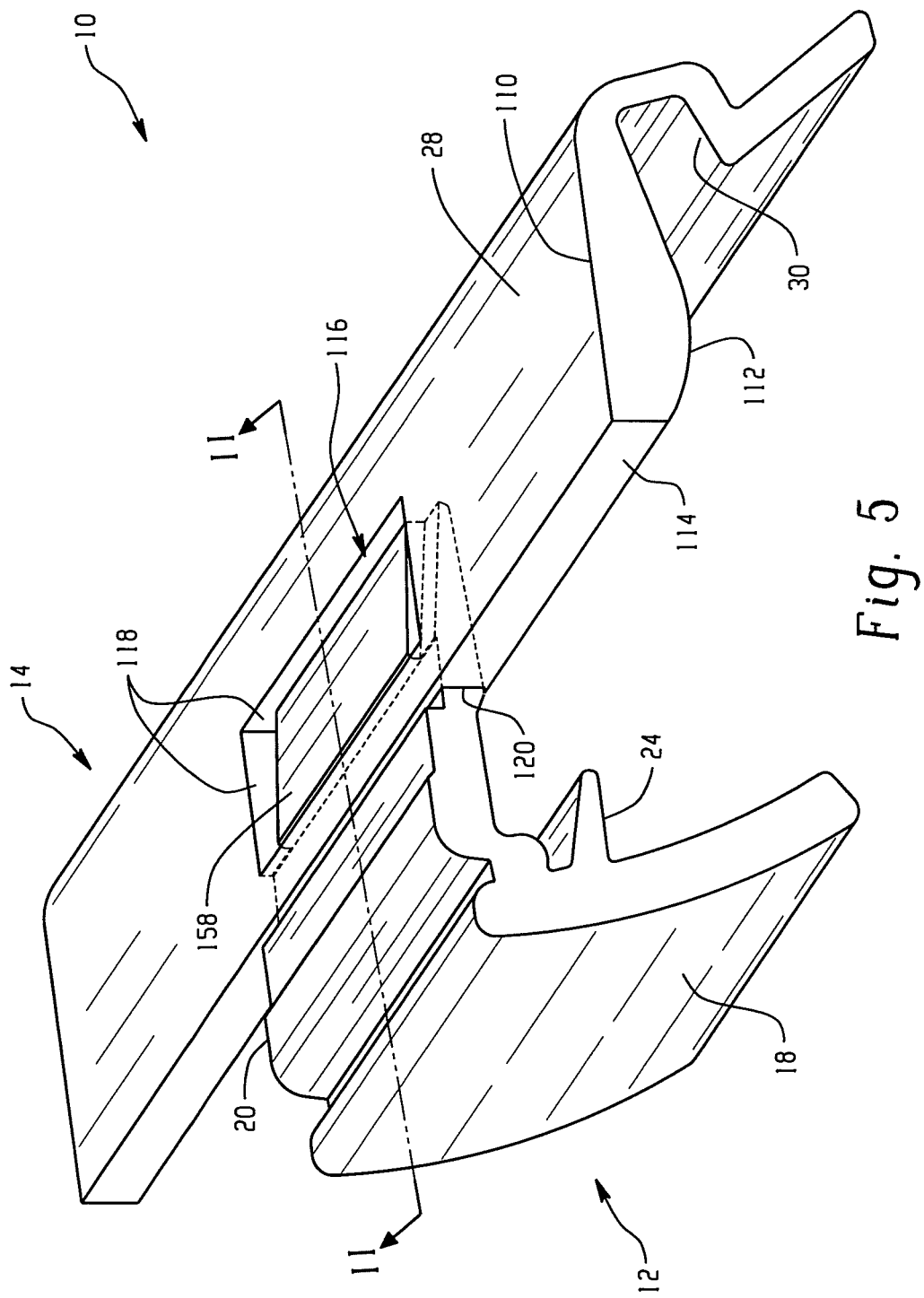
FIG. 5 is a perspective view of a second embodiment of an elongated retainer assembly.
Figure 6:
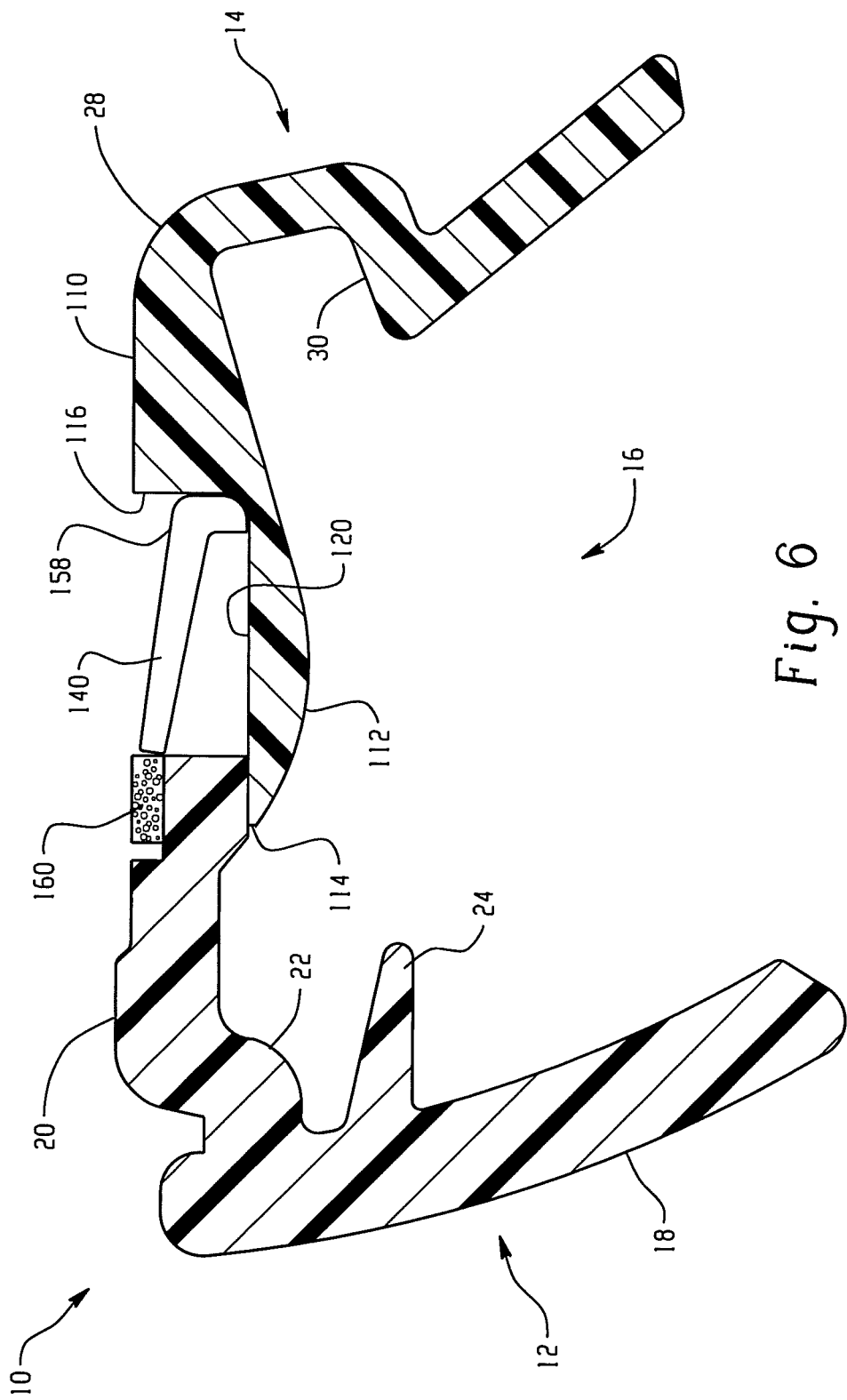
FIG. 6 is a cross-sectional view taken generally along the lines II-II of the retainer assembly shown in FIG. 5.

A second embodiment of the male and female mechanical securing members is shown in FIGS. 5 and 6. The second base portion 28 of the second retainer portion 14 includes a planar surface 110 opposite a convex, arcuate inner surface 112. The planar surface 110 faces the body of the associated vehicle while the arcuate surface 112 faces the interior weatherstrip receiving cavity 16. A second terminal edge 114 is formed between the flat surface 110 and the arcuate surface 112.

At least one opening 116 is formed through the planar surface 110 to the space. The opening 116 functions to catch a corresponding planar protrusion 158 on the locking tab 140 and effectively seats the locking tab in recess 120. The planar protrusion 158 extends outwardly from the first planar surface 142 and through the opening 116 of the second retainer portion 14. In this manner, the planar protrusion 158 essentially functions as the locking tab 140 when it is pushed into the reduced height of locking recess 120. A height of the planar protrusion 158 extends upwardly from the sidewalls 118 which form the opening 116; hence, the planar protrusion seats within the opening to lock any movement of the locking tab 140.

FIG. 6 also illustrates a foam member 160 that may be added to prevent moisture intrusion along this locking tab 140 interface with the opening 116. The foam member also serves to reduce or eliminate squeak and rattle between the components. The foam member 160 may be dimensioned to normally extend above the planar surface 110 and will be compressed when the retainer is secured to the vehicle body.

FIG. 7 further illustrates mounting of a weatherseal W in the retainer assembly. The weatherseal is received in the cavity formed by the assembled first and second retaining portions and retained by the retaining flanges 24, 30. The retaining flanges engage the respective undercut regions R1, R2 in a base portion of the weatherseal and position the weatherseal in the cavity 16 in a manner that a peripheral edge of the associated window (not shown) is received in the weatherseal to seal the interior of the vehicle from the external elements.

Figure 8:
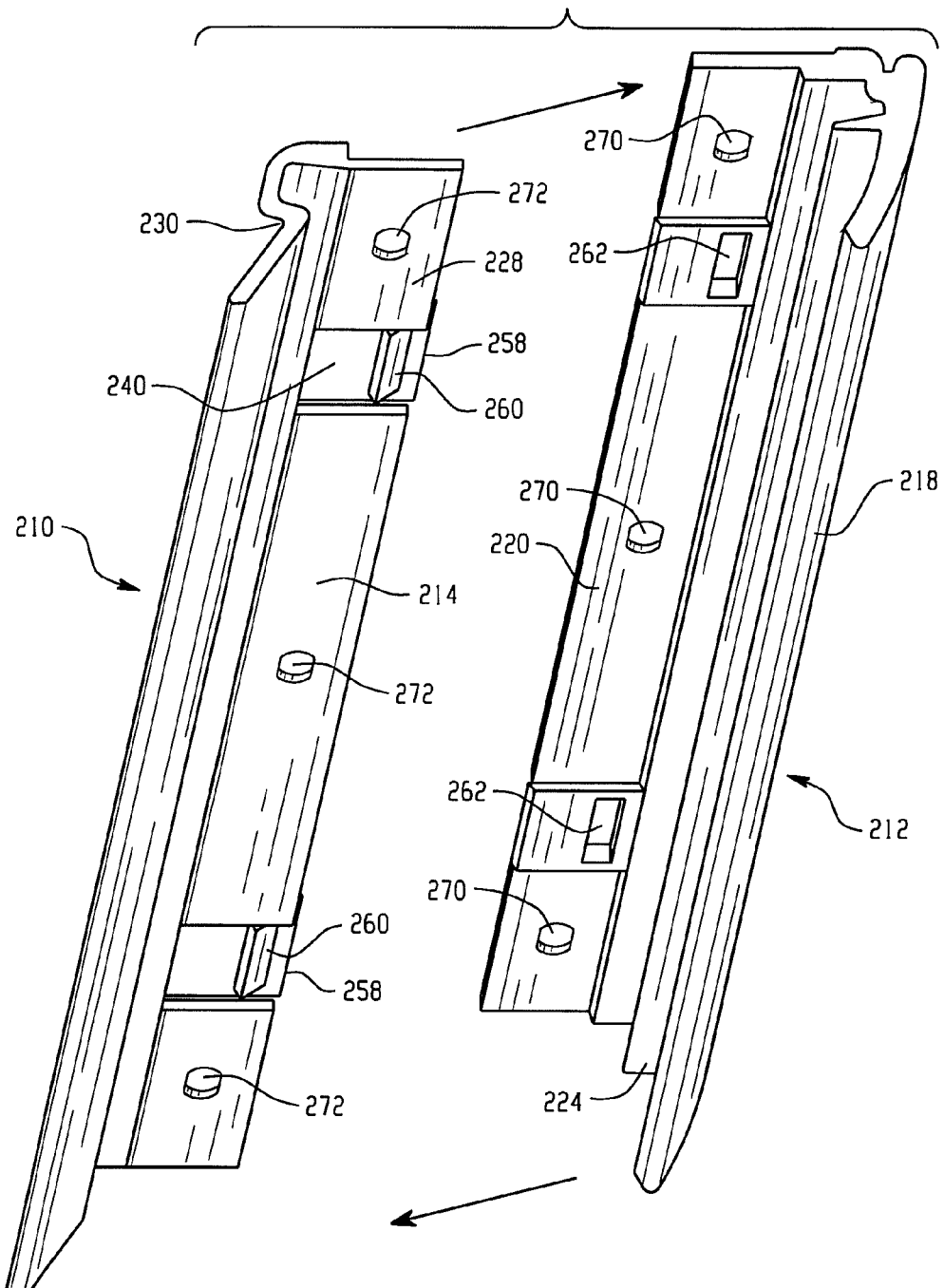
FIG. 8 is a perspective view of a fourth embodiment of the disclosure.
Figure 9:
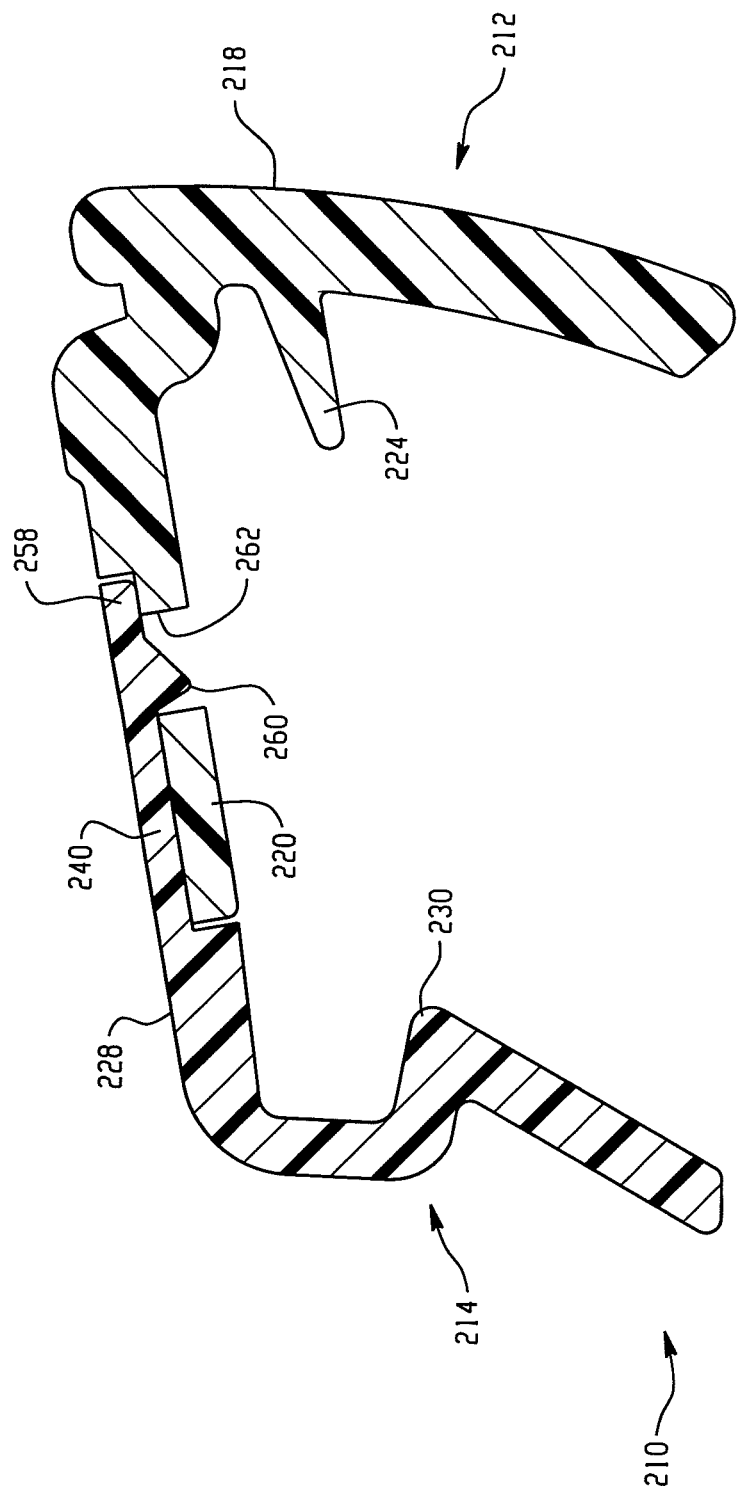
FIG. 9 is a cross-sectional view of the assembled arrangement of FIG. 8.

Turning to FIGS. 8-10, retainer assembly 210 secures a weatherseal W to an associated vehicle body. A first retainer portion 212 includes an outer show surface or show portion 218 that extends from first base portion 220. Again, the show portion and the first base portion are disposed in a generally L-shaped configuration. A retaining flange 224 protrudes inwardly from an inner surface on the show portion and preferably at a location that allows it to facilitate retention of the weatherseal W (FIG. 10).

The second retainer portion 214 is mechanically joined and operatively connected to the first retainer portion when the generally planar base portion 228 is advanced in overlying relation with the first base portion 220. Shoulder or retaining flange 230 engages an undercut region of the weatherseal in a manner similar to the earlier embodiments so that the weatherseal is not inadvertently removed from the retainer assembly once the retainer assembly is mechanically engaged. First and second mechanical securing members of the base portions 220, 228 couple in a manner that maintains the generally planar relation. In this embodiment, locking tab portion 240 is provided on the second retainer portion so that leading edge 258 slides over surface 220 and locking tab 260 is received in a corresponding recess or opening 262 in the first retainer portion. As shown in FIG. 8, a pair of the locking tabs are provided, although a greater or lesser number of tabs may be provided along the length of the retainer portions. In addition, alignment openings 270, 272 are provided in the base portion of each of the first and second retainer portions and adapted to each receive a fastener that secures the retainer assembly to a vehicle body surface 300. The fastener is generally referenced as 302. The fastener also holds the planar regions 214, 220 in flush, planar relation so that the retainer portions cannot easily separate due to the mechanical engagement of the tabs with the recesses 262 and by being pressed against the body surface 300 of the vehicle. This arrangement of FIGS. 8-10 provides for a slightly modified configuration that does not require a full cavity being formed in either of the first or second retainer portions to receive the tab from the other of the first and second retainer portions and therefore is easier to mold and assemble.

It is also appreciated that if subsequent repair work is required, the fasteners can be removed and one or both of the retainer portions easily slid apart relative to the other, and the weatherseal removed or replaced if necessary. Re-assembly of the components is then easily accomplished in the same manner as described above.

Also shown in FIG. 10 is a cavity 310 formed in one of the retainer portions, here the outer or first retainer portion 212. The cavity 310 is adapted to receive a light source 312, which may be individual spaced light members or a light strip such as an LED light strip. One of the retainer portions advantageously provides protection for the light source 312 in the cavity 310 and, due to the gap or spacing 314 relative to the body 300 of the vehicle, provides for an illuminated region about the perimeter of the retainer assembly, particularly the show surface. Of course, other locations for the LED may be desired in the retainer assembly without departing from the scope and intent of the present disclosure.

In any of the embodiments described above, one skilled in the art will recognize that the first and second retainer portions may be formed from the same material or from dissimilar materials. This can be particularly useful in terms of cost savings and aesthetic appearance where different materials may be desired at different locations on the vehicle. Typically, the two materials are each plastic, but this is not always necessary. The plastic(s) can be easily molded into the desired conformation and allows for a more efficient use of assembled components such that they may be disassembled and a new or different component can be added. All of this can be achieved with common tooling. Further, this integrated snap-fit mechanical engagement eliminates the use of sonic welding or heat staking equipment and the necessity of like or compatible materials to be used in the prior arrangement. Moreover, the snap-fit mechanical engagement is essentially hidden from view once the retainer assembly is secured to the vehicle.

As shown and described in the '849 patent, a fastener arrangement secures the retainer assembly to a vehicle body. The fasteners extend through aligned mating holes in the vehicle body and the retainer assembly. Alternatively, a tape can be used with or without the fasteners to secure to the planar surface of the retainer assembly to the vehicle body.

The disclosure has been described with reference to the preferred embodiments. Modifications and alterations will occur to others upon reading and understanding this specification. It is intended to include all such modifications and alterations in so far as they come within the scope of the appended claims or the equivalents thereof.

I claim:

1. A retainer assembly for securing an associated weatherseal to an opening edge of a body side of an associated vehicle, the retainer assembly comprising:
   a first retainer portion, including:
      a first base portion,
      an outer show portion extending from the first base portion and dimensioned to overlie a perimeter of the body side of the associated vehicle,
      a retaining flange protruding from an inner surface of the outer show portion, and
      a first mechanical securing member provided in the first base portion, the first mechanical securing member including deflectable locking tabs extending outwardly from the first base portion at longitudinally spaced locations along a length of the first base portion; and,
   a second retainer portion operatively cooperating with the first retainer portion, including:
      a second base portion at least partially overlapping the first base portion,
      a leg extending outwardly from the second base portion,
      a second mechanical securing member provided in the second base portion, the second securing member including one of plural recesses/openings provided in the second base portion at longitudinally spaced locations along a length of the second base portion, each recess/opening dimensioned to receive one the deflectable locking tabs therein, and
      a retaining flange protruding from an inner surface of the leg;
   wherein the first mechanical securing members cooperates with the second mechanical securing members such that the first and second retainer portions form an interior weatherstrip cavity dimensioned to receive the associated weatherseal and the retaining flanges dimensioned to hold the associated weatherseal within the cavity.

2. The retainer assembly of claim 1 wherein the first and second retainer portions are formed from dissimilar first and second materials.

3. The retainer assembly of claim 2 wherein the first and second materials are both a polymer material.

4. The retainer assembly of claim 1 wherein both the first and second mechanical securing members are situated at opposing terminal edges of the first and second base portions such that the first and second base portions couple to form a generally planar undersurface of the retainer assembly, the planar undersurface adapted to be flush with the associated vehicle body.

5. The retainer assembly of claim 1 further comprising a light source operatively connected to one of the first and second retainer portions.

6. A retainer assembly for securing an associated weatherseal to an opening edge of a body side of an associated vehicle, the retainer assembly comprising:
   a first retainer portion, including:
      a first base portion,
      and
      at least one male mechanical securing member situated at a first terminal edge of the first base portion, the male mechanical securing member including deflectable locking tabs extending outwardly from the first base portion at longitudinally spaced locations along a length of the first base portion;
   a second retainer portion operatively cooperating with the first retainer portion, including:
   a second base portion at least partially overlapping the first base portion,
   a leg extending outwardly from the second base portion, and
   at least one female mechanical securing member situated at a second terminal edge of the second base portion, the female securing member including one of plural recesses/openings provided in the second base portion at longitudinally spaced locations along a length of the second base portion, each recess/opening dimensioned to receive one the deflectable locking tabs therein;
   wherein both the at least one male and the at least one female mechanical securing members are situated adjacent opposing edges such that the first and second base portions couple to form a generally planar undersurface of the retainer assembly, the planar undersurface adapted to be flush with the body of the associated vehicle; and
   a first opening in the first retainer portion and a second opening in the second retainer portion that receives a fastener extending through each of the first and second openings to hold the first and second base portions together in flush planar relation and securing the retainer assembly against the body side of the associated vehicle.

7. The retainer assembly of claim 6 wherein the first retainer portion further includes a retaining flange protruding from an inner surface of an outer show portion, and the second retainer portion further includes a retaining flange protruding from an inner surface of the leg, wherein the at least one female mechanical securing member receives the at least one male mechanical securing member such that the first and the second retainer portions couple to form an interior weatherstrip cavity dimensioned to receive the associated weatherseal, and the retaining flanges dimensioned to hold the associated weatherseal within the cavity.

8. The retainer assembly of claim 6 wherein the first and second retainer portions are formed from dissimilar first and second materials.

9. The retainer assembly of claim 6 wherein the first and second materials are both a polymer material.

10. The retainer assembly of claim 7 wherein the second base includes:
    a flat surface facing the body of the associated vehicle;
    an opposing flat surface facing the cavity; and,
    an arcuate, raised portion in the opposing flat surface immediate the at least one female mechanical securing member, the raised portion accommodates a locking recess of the at least one female mechanical securing member for which the at least one male mechanical securing member is received.

11. The retainer assembly of claim 10 wherein the first base portion includes:
    a generally planar surface terminating at the first terminal edge;
    a pair of legs continuing outwards a limited length of the first base portion; and,
    a depressible, inward-turned locking tab between terminal ends of the pair of legs, the locking tab follows an arcuate curve of the raised portion on the second base portion;
    wherein a cross-area of the locking tab is capable of receipt into a space formed between the pair of legs.

12. The retainer assembly of claim 10 wherein the locking tab is biased toward the cavity, the locking tab is depressible toward the flat surface of the second base portion such that the at least one male mechanical securing member of the first retainer portion is capable of release from the at least one female mechanical securing member of the second retainer portion.

13. The retainer assembly of claim 7 wherein the second base portion includes:
    a substantially planar surface opposite a convex, arcuate surface, the planar surface faces the body of the associated vehicle and the arcuate surface faces the cavity; and,
    at least one window formed through the planar surface, the at least one window providing access to the female mechanical securing member.

14. The retainer assembly of claim 13 wherein the first base portion includes:
    a generally planar surface facing the body of the associated vehicle;
    a channel formed along a length of the first planar surface;
    a planar protrusion on the planar surface, the planar protrusion extends from the channel to the first terminal edge of the first base portion;
    wherein the planar protrusion is shorter in length than the first base portion, a cross-area of the planar protrusion is equal to the least one window formed through the second base portion, the at least one window accommodates the planar protrusion when the female mechanical securing member of the second base portion receives the male mechanical securing member of the first base portion.

15. The retainer assembly of claim 14 wherein the planar protrusion is a depressible locking tab that is biased toward the cavity, the locking tab is depressible toward the flat surface of the second base portion such that the male mechanical securing member of the first retainer portion is capable of release from the at least one female mechanical securing member of the second retainer portion.

16. A retainer and weatherseal assembly for securing the weatherseal to an opening edge of a body side of an associated vehicle, the assembly comprising:
- a first retainer portion, including:
  - a first base portion,
  - an outer show portion extending from the first base portion and dimensioned to overlie a perimeter of the body side of the associated vehicle,
  - a retaining flange protruding from an inner surface of the outer show portion, and
  - at least one locking tab member situated at a first terminal edge of the first base portion;
- a second retainer portion operatively cooperating with the first retainer portion, including:
  - a second base portion,
  - a leg extending outwardly from the second base portion,
  - a retaining flange protruding from an inner surface of the leg, and
  - at least one locking recess situated at a second terminal edge of the second base portion, the at least one locking recess is capable of receiving a corresponding retainer portion,
- wherein both the at least one locking tab and the at least one locking recess are situated at opposing edges such that the first and second base portions couple to form a generally planar undersurface of the retainer assembly, the planar undersurface is flush with the body of the associated vehicle;
- wherein the at least one locking recess receives the at least one locking tab such that the first and second retainer portions form an interior weatherstrip cavity dimensioned to receive the weatherseal and the retaining flanges dimensioned to hold the weatherseal within the cavity; and
- a first opening in the first retainer portion and a second opening in the second retainer portion that receive a fastener extending through each of the first and second openings to hold the first and second base portions together in flush planar relation and secure the retainer assembly against the body side of the associated vehicle.

17. The retainer and weatherseal assembly of claim 16 further comprising an LED light strip received on one of the first and second retainer portions.

18. The retainer and weatherseal assembly of claim 1 further comprising a first opening in the first retainer portion and a second opening in the second retainer portion that receive a fastener extending through each of the first and second openings to hold the first and second base portions together in flush planar relation and secure the retainer assembly against the body side of the associated vehicle.

19. The retainer and weatherseal assembly of claim 1 further comprising an adhesive securing the retainer assembly against the body side of the associated vehicle.

20. The retainer and weatherseal assembly of claim 6 further comprising a first opening in the first retainer portion and a second opening in the second retainer portion that receive a fastener extending through each of the first and second openings to hold the first and second base portions together in flush planar relation and secure the retainer assembly against the body side of the associated vehicle.

21. The retainer and weatherseal assembly of claim 6 further comprising an adhesive securing the retainer assembly against the body side of the associated vehicle.

* * * * *